(12) United States Patent
Jelinek et al.

(10) Patent No.: US 7,126,590 B2
(45) Date of Patent: Oct. 24, 2006

(54) USING RF IDENTIFICATION TAGS IN WRITING INSTRUMENTS AS A MEANS FOR LINE STYLE DIFFERENTIATION

(75) Inventors: Lenka M. Jelinek, Hillsboro, OR (US); William C. DeLeeuw, Portland, OR (US); Herman D'hooge, Hillsboro, OR (US); Frank T. Brown, Beaverton, OR (US); David H. Koizumi, Shoreline, WA (US)

(73) Assignee: Intel Corporation, Santa Clara, CA (US)

( * ) Notice: Subject to any disclaimer, the term of this patent is extended or adjusted under 35 U.S.C. 154(b) by 704 days.

(21) Appl. No.: 09/971,160

(22) Filed: Oct. 4, 2001

(65) Prior Publication Data

US 2003/0066691 A1 Apr. 10, 2003

(51) Int. Cl.
*G09G 5/00* (2006.01)
(52) U.S. Cl. ............... 345/179; 345/173; 178/18.01
(58) Field of Classification Search ........... 345/173, 345/174, 179; 178/18.01, 18.03, 18.05, 18.06, 178/19.01, 19.03, 18.07
See application file for complete search history.

(56) References Cited

U.S. PATENT DOCUMENTS

| | | | |
|---|---|---|---|
| 4,464,118 A | 8/1984 | Scott et al. | |
| 4,633,436 A | 12/1986 | Flurry | |
| 4,690,644 A | 9/1987 | Flanders et al. | |
| 4,793,810 A | 12/1988 | Beasley, Jr. | |
| 5,007,085 A * | 4/1991 | Greanias et al. | 380/25 |
| RE33,805 E * | 1/1992 | Fleck et al. | 178/19 |
| 5,100,329 A | 3/1992 | Deesen et al. | |
| RE35,329 E * | 9/1996 | Murakami et al. | 178/19 |
| 5,730,602 A | 3/1998 | Gierhart et al. | |
| 5,874,722 A * | 2/1999 | Rando et al. | 235/472 |
| 5,911,533 A * | 6/1999 | Fassler | 401/195 |
| 5,957,604 A * | 9/1999 | Anderson | 401/96 |
| 6,045,281 A * | 4/2000 | Bunn et al. | 401/195 |
| 6,104,291 A * | 8/2000 | Beauvillier et al. | 340/572.1 |
| 6,215,901 B1 | 4/2001 | Schwartz | |
| 6,259,438 B1 * | 7/2001 | Fleck et al. | 345/184 |
| 6,373,492 B1 * | 4/2002 | Kroitor | 345/473 |
| 6,515,654 B1 * | 2/2003 | Liao | 345/173 |
| 6,681,045 B1 * | 1/2004 | Lapstun et al. | 382/187 |
| 6,924,442 B1 * | 8/2005 | Nakano et al. | 178/19.01 |
| 2001/0000666 A1 * | 5/2001 | Wood et al. | 345/179 |
| 2002/0160342 A1 | 10/2002 | Castro | |

* cited by examiner

*Primary Examiner*—Richard Hjerpe
*Assistant Examiner*—Kimnhung Nguyen
(74) *Attorney, Agent, or Firm*—Blakely, Sokoloff, Taylor & Zafman LLP (57) ABSTRACT

One aspect of the invention involves the output of a radio frequency (RF) identification tag by a writing instrument to indicate ink color or another characteristic associated with a line style parameter of the writing instrument. The RF identification tag is a wireless signal that uniquely identifies the line style parameters, such as physical-ink or virtual-ink color, produced when using the writing instrument. A writing tablet receives the RF identification tag and signals a computing device, responsible for displaying graphical representations made on the writing tablet, to display a portion of the graphical representation formed by that writing instrument with the characteristics of the line style parameters specified by the RF identification tag.

21 Claims, 5 Drawing Sheets

USING RF IDENTIFICATION TAGS IN WRITING INSTRUMENTS AS A MEANS FOR LINE STYLE DIFFERENTIATION

FIELD

The invention generally relates to the field of writing devices. More specifically, one embodiment of the invention relates to a device and method for communicating a unique identifier, being representative of line style parameters associated with a writing instrument, to a writing tablet.

GENERAL BACKGROUND

Over the past decade, both parents and institutions are relying more heavily on educational toys as supplement learning tools. One popular education toy is a writing tablet that is communicatively coupled to a computer. Normally, a stylus or other non-ink producing writing instrument accompanies the tablet. As one end of the stylus comes into contact with a writing surface of the tablet, its location is registered by a sensing mechanism situated within the tablet. In response to the user gliding the stylus across the writing surface of the tablet, outlining a desired graphical representation (e.g., a handwritten alphanumeric character, an image, etc.), the computer generates a corresponding graphical representation for display on its monitor screen.

One problem with conventional writing tablets is that the user has no ability to discern what color is currently associated with the stylus. The current color associated with the stylus is merely ascertained by the user when the graphical representation being rendered on the tablet is displayed on the computer monitor. This may slightly impede the learning of colors by children and unnecessarily causes drawing errors by the user who may not be aware of the selected color or particular line thickness or patterns produced by the stylus.

Another problem with conventional writing tablets is that regular ink-filled writing instruments cannot be used with the tablet.

BRIEF DESCRIPTION OF THE DRAWINGS

The features and advantages of the invention will become apparent from the following detailed description of the present invention in which.

DETAILED DESCRIPTION

In general, one embodiment of the invention generally relates to a device and method for communicating line style parameters such as physical or virtual ink color of a writing instrument using a unique identifier. For clarity, the term "writing" and related tenses used herein involve the act of handwriting and/or drawing. Also, certain details are set forth below in order to provide a thorough understanding of the invention, albeit the invention may be practiced through many embodiments other that those illustrated. Well-known circuits and operations are not set forth in detail in order to avoid unnecessarily obscuring the invention.

In the following description, certain terminology is used to describe certain features of the invention. For example, a "computing device" includes logic, namely hardware, firmware, software module(s) or any combination thereof that performs a desired function. In one embodiment, the computing device is a computer such as a desktop computer, laptop computer, hand-held (e.g., personal digital assistant), a mainframe, a workstation, a server or any computer architecture. Other examples of computing devices include, but are not limited or restricted to other communication equipment such as an alphanumeric pager, a facsimile machine, a set-top box or a wireless telephone for example.

A "physical-ink writing instrument" is any device that dispenses writing solution during use. Examples of writing solution includes ink, dry powder inclusive of chalk, crayon, lead and the like. Examples of a physical-ink writing instrument includes a marker, ink-filled pen, pencil, crayon, etc. A "virtual-ink writing instrument" is any device that, during use, does not dispense writing solution. Examples of a virtual-ink writing instrument includes a stylus.

A "software module" is a series of instructions that, when executed, performs a certain function. Examples of a software module include an operating system, an application, an applet, a program or even a routine. One or more software modules may be stored in a machine-readable medium, which includes but is not limited to an electronic circuit, a semiconductor memory device, a read only memory (ROM), a flash memory, a type of erasable programmable ROM (EPROM or EEPROM), a floppy diskette, a compact disk, an optical disk, a hard disk, and the like.

In addition, a "link" is generally defined as one or more physical or virtual information-carrying mediums to establish a communication pathway. Types of mediums include electrical wire, electrical or optical cable, air in combination with wireless signaling technology employed at the computing device and/or a writing tablet, and other means of communication.

A "graphical representation" includes one or more lines segments (e.g., visible points connected together) that form (i) handwritten alphanumeric characters or symbols or (ii) images featuring any geometrical shaped object or artistic rendering. The alphanumeric characters may be in any case (upper/lower) or style (cursive or printed) and in accordance with any character type (e.g., Roman, Kanji, Arabic, Chinese, etc.).

A "line style parameter" indicates indicia associated with line segments produced by a writing instrument. Examples of various types of indicia may include, but are not limited or restricted to physical or virtual ink color, line segment thickness, line segment pattern types (e.g., solid, dashed, dotted, spray or any other graphic object), animation effects (e.g., wiggle, stamps, sparkle, etc.), special effects (e.g., blending of colors, line segment thickness or patterns, animated effects or any combination thereof between two intersecting line segments, masking through removal of color, line segment thickness or patterns, or animated effects within a region of intersecting line segments, color reversal by changing a color within a region of intersecting line segments to a prescribed opposite color, etc.) as well as levels of transparency or erasure.

Figure 1:
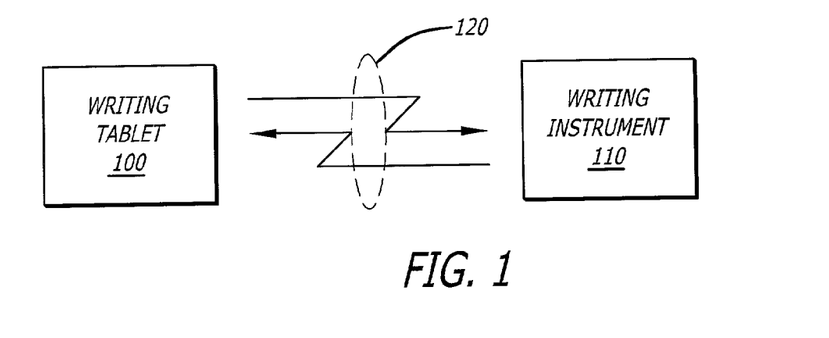
FIG. 1 is an exemplary embodiment of a writing tablet communicatively coupled to a writing instrument.

Referring to FIG. 1, an exemplary embodiment of a writing tablet 100 communicatively coupled to a writing instrument 110 over a link 120 is shown. For this particular embodiment, the link 120 includes one or more wireless channels. These wireless channels support the transfer of data between the tablet 100 and the writing instrument 110 in a unidirectional or bi-directional fashion as shown. The data transfer may be as radio frequency (RF) signals in accordance with recognized modulation and demodulation techniques. Of course, in the alternative, the wireless communications may be conducted through infrared or other wireless communication protocols as well as physical mediums such as electrical wires or cable where the writing instrument 110 is tethered to the tablet 100.

Figure 2A:
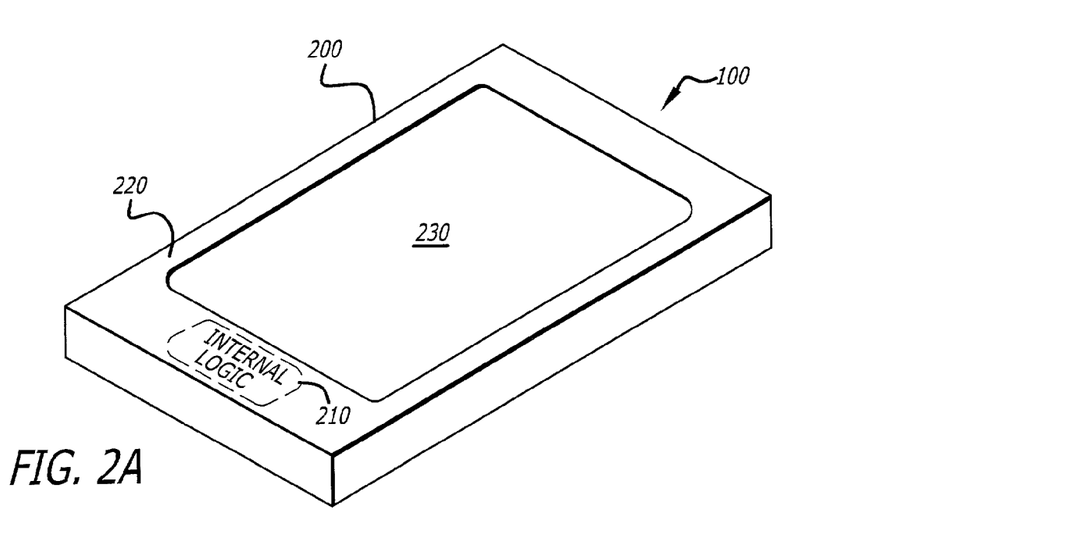
FIGS. 2A and 2B are a collective representation of a first embodiment of the writing tablet of FIG. 1 is shown.
Figure 2B:
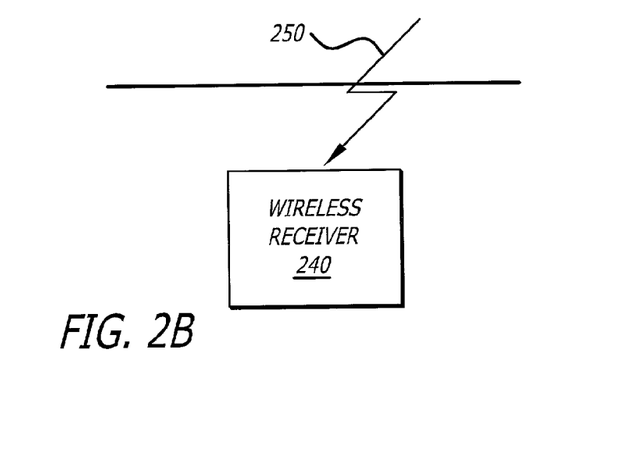

As shown in FIGS. 2A and 2B, a collective representation of a first exemplary embodiment of the tablet 100 is shown. The tablet 100 comprises a housing 200 made of a rigid material such as hardened plastic. The housing 200 protects internal logic 210 employed within the housing 200. One surface 220 of the housing 200 features a writing area 230 being a region made of a semi-opaque material having a translucent or transparent quality (e.g., plastic, glass, etc.) or a liquid crystal display (LCD) screen. In one embodiment, the writing area 230 is sized to accommodate an overlay of standard letter size paper (8.5"×11"), although other sized screens may be implemented as an alternative.

In one embodiment, a graphical representation written by the user over the writing area 230 is transferred to a computing device (not shown). The computing device is in communications with the tablet 100 and controls display of the graphical representation on a monitor screen of the computing device (hereinafter referred to as the "device monitor"). Alternatively, the graphical representation may be displayed on the writing area 230 of the tablet 100 itself.

As shown in FIG. 2B, the internal logic 210 includes a wireless receiver 240. The wireless receiver 240 receives wireless signals from one or more writing instruments in accordance with a unicast or multicast communication scheme. The transmission range for the wireless signals may be adjusted so that the wireless receiver 240 can detect the wireless signals from writing instruments that are in contact with or in close proximity to the writing area 230 (e.g., less than one centimeter from the surface). Normally, this range may be varied by adjusting the level of effective isotropic radiated power (referred to as the "power level") utilized by the wireless receiver 240. However, it is contemplated that the power level may be configured to be at a constant level.

The wireless receiver 240 is capable of receiving an incoming wireless signal 250 from the writing instrument 110 as shown in FIG. 1. The incoming wireless signal 250, generally referred to as a "RF identification tag" for this embodiment, operates as a unique identifier by identifying line style parameters associated with the writing instrument.

For example, the RF identification tag may indicate the color of either the physical-ink or virtual-ink writing instrument currently in use with the tablet 100. Different RF identification tags are associated with different colors, where each color type corresponds to a unique RF identification tag. The RF identification tag may further indicate, for example, that the line segments produced by the writing instrument during use have a prescribed line thickness and/or pattern.

Figure 3:
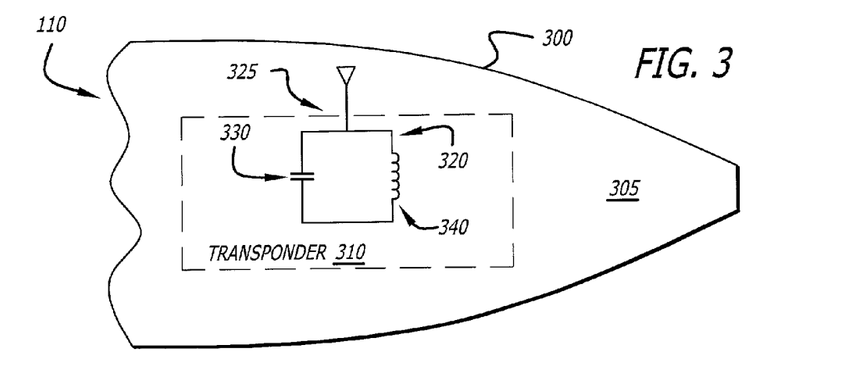
FIG. 3 is a first exemplary embodiment of the writing instrument of FIG. 1.

Referring now to FIG. 3, a first exemplary embodiment of the writing instrument 110 of FIG. 1 is shown. For this embodiment, the writing instrument 110 operates as a virtual-ink writing instrument that does not dispense writing solution during use. As the user places the writing instrument 110 in physical contact with the writing area of the tablet and glides the writing instrument 110 over the writing area, the tablet signals the computing device to display a graphical representation as made in the writing area. In the event that the graphical representation is displayed in color, it is important for the writing instrument 110 to identify a selected color represented by the virtual-ink writing instrument (referred to as the "virtual-ink color") to the tablet. Also, it is important for the writing instrument 110 to identify other indicia represented by line style parameters associated therewith.

Herein, for this embodiment, the writing instrument 110 includes a casing 300 made of a rigid material such as hardened plastic. The casing 300 protects a transponder 310 that is placed within an inner cavity 305 formed by the casing 300. Operating as an active RF signaling device or a passive RF signaling device as shown, the transponder 310 provides an RF identification tag, which is a unique, selected frequency resonating from the transponder 310 that corresponds to the line style parameters associated with the writing instrument 110.

As shown herein, one embodiment for the transponder 310 may be an inductor-capacitor (LC) circuit 320, perhaps adapted to an antenna 325. The oscillating frequency of the transponder 320 is formed as the capacitor 330 undergoes charging and discharging operations controlled by the inductor 340. More specifically, as the capacitor 330 discharges, the inductor 340 charges a plate of the capacitor 330. As the inductor's magnetic field collapses, the capacitor 330 has been recharged with an opposite polarity. By associating different oscillation patterns with different line style parameters, the tablet is able to discern the selected color and/or other line style parameter indicia associated with the writing instrument 110.

Figure 4A:
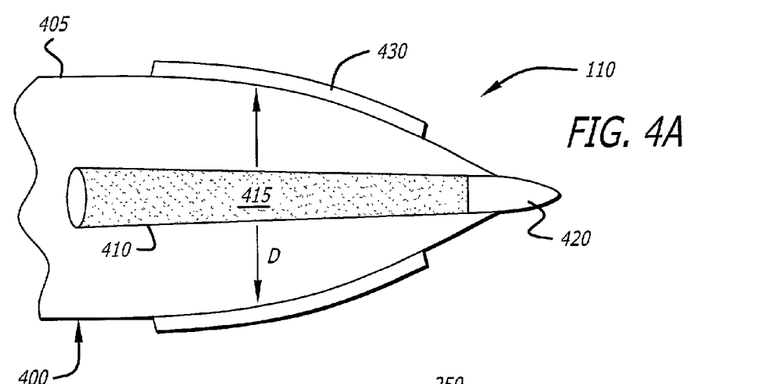
FIGS. 4A and 4B are a collective representation of a second exemplary embodiment of the writing instrument of FIG. 1.
Figure 4B:
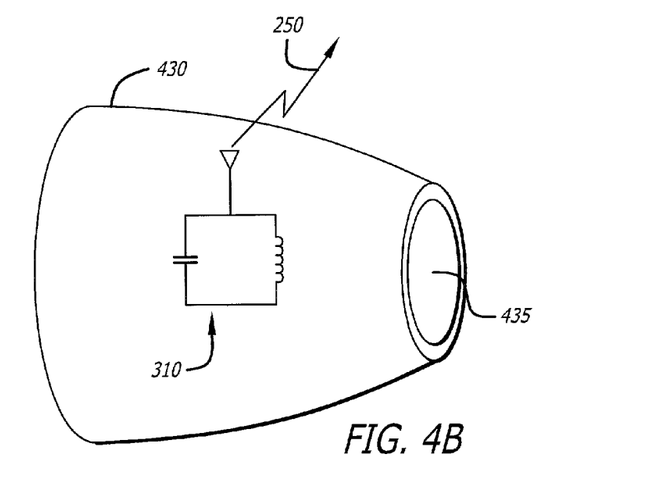

Referring now to FIGS. 4A and 4B, a collective representation of a second exemplary embodiment of the writing instrument 110 of FIG. 1 is shown. For this embodiment, the writing instrument 110 contains a writing solution within a substantially sealed reservoir container and extrudes the writing solution when used.

The writing instrument 110 includes a casing 400 generally encapsulating a reservoir container 410. The reservoir container 410 stores the writing solution 415 and supplies the writing solution 415 to a writing head 420 of the writing instrument 110 during use. The writing head 420 may be a porous felt marker tip, a ball point and the like.

As generally shown, a sleeve 430 is adapted for placement over an outer surface 405 of the casing 400. For instance, in one embodiment, the sleeve 430 includes a cylindrical aperture 435 for placement over a portion of the outer surface 405 of the casing 400. The sleeve 430 is made of a generally pliable material which allows the inner diameter of the cylindrical aperture 435 to be approximately equivalent to or even slightly less than a diameter (D) formed by the outer surface 405 of the casing 400. This allows the sleeve 430 to fit snugly on the casing 400.

In another embodiment, the sleeve 430 may be made of a rigid material and features an inner diameter formed by the aperture 435 that is substantially equal to the diameter (D)

of the casing 400. Also, for yet another embodiment, the sleeve 430 may be a piece of material with a fastening mechanism (e.g., VELCRO® fastener) that is wrapped around a writing instrument and fastened thereto.

The sleeve 430 is adapted with the transponder 310 as described in FIG. 3. An RF Identification tag 250 indicates line style parameters corresponding to the sleeve 430. For example, if the sleeve 430 represents a blue virtual-ink color and a dashed line pattern, the sleeve 430 may illustrate dashed blue lines. The transponder 310 periodically outputs the RF identification tag 250 so that, when proximate to the writing area of the tablet, the tablet can determine the line style parameters of the writing instrument 110. For clarity sake, further discussion set forth below is directed to ink color (virtual or physical). However, any indicia provided by a line style parameter (e.g., line pattern, thickness, etc.) may be substituted for and included in combination with ink color.

Figures 5A, 5B:
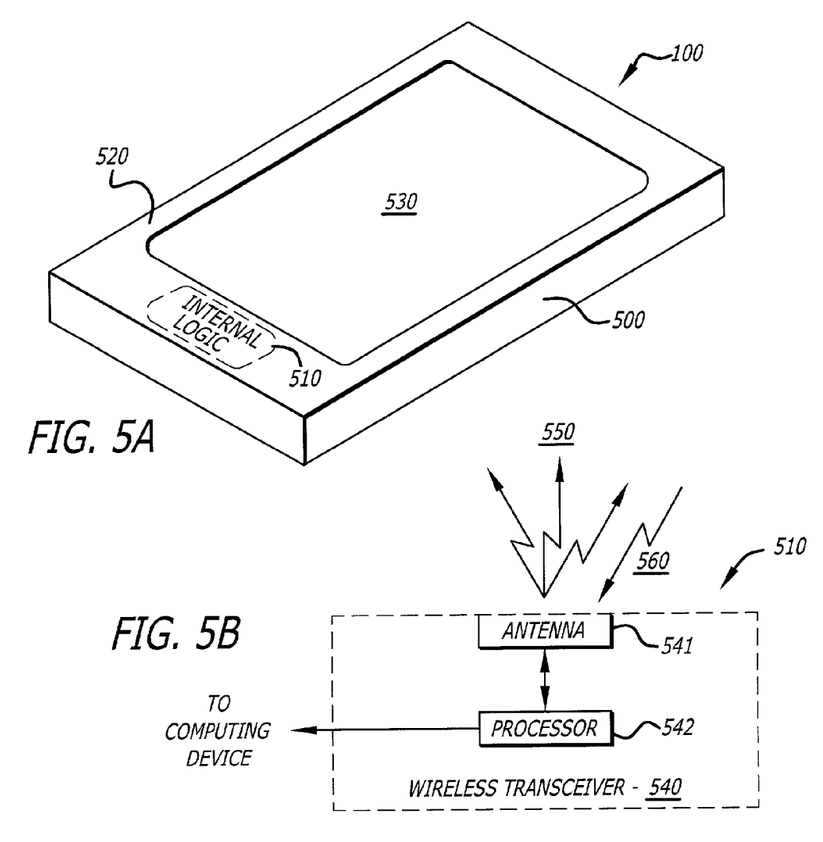
FIGS. 5A and 5B are a collective representation of a second exemplary embodiments of the writing tablet of FIG. 1.

As shown in FIGS. 5A and 5B, a collective representation of a second exemplary embodiment of the tablet 100 is shown. Similar to FIGS. 2A and 2B, the tablet 100 comprises a housing 500 that protects internal logic 510 and features a writing area 530 on one surface 520 of the housing 500.

As shown in FIG. 5B, the internal logic 510 includes a wireless transceiver 540. The wireless transceiver 540 receives wireless signals from one or more writing instruments within a transmission range configured so that the internal logic 510 can detect the wireless signals from writing instruments that are in contact with or in close proximity to the writing area 530.

For this embodiment, the wireless transceiver 540 comprises an antenna 541 and a processor 542. Internally maintained within the housing 500, for this embodiment, the antenna 541 enables wireless signals to be transmitted from and received by the tablet 100. Alternatively, it is contemplated that the antenna 541 may be adapted to protrude from the housing 500 in order to mitigate any interference caused by the housing 500.

Successive wireless signals may be generated by the processor 542 and periodically transmitted by the tablet 100 at a first approximate frequency. Normally, the periodicity is static in nature; however, it is contemplated that it may be configured to be programmable. Of course, in order to support and detect multiple colors of writing instruments, the tablet 100 may be adapted to periodically transmit multiple wireless signals at different frequencies within a predetermined frequency range. For illustrative sake, the wireless signals are described as types of radio frequency (RF) signals.

In one embodiment, the processor 542 generates an outgoing RF signal referred to as a "color inquiry signal" 550. The color inquiry signal 550 is transmitted over the antenna 541. In response, the antenna 541 may receive an incoming RF signal 560 from a writing instrument 110 as shown in FIG. 1. The incoming RF signal 560, referred to as a "color reply signal," is processed by the processor 542 in order to extract information therefrom. For this embodiment, the extracted information includes a RF identification tag transmitted by the writing instrument. As previously described, the "RF identification tag" is data that indicates the virtual-ink or physical-ink color provided by the writing instrument currently in use. Such data is unique for each color.

After extracting the RF identification tag by the writing tablet 100, the color type represented by the RF identification tag is subsequently conveyed to the computing device. This is performed so that the computing device accurately displays on the device monitor the color being used in creating at least a portion of a graphical representation.

Figure 6:
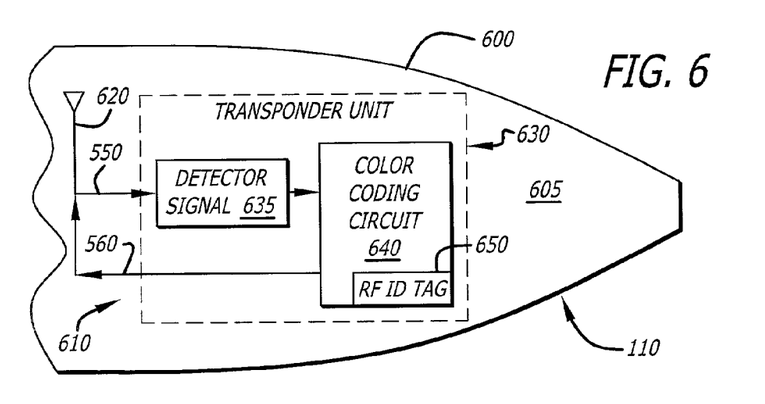
FIG. 6 is a third exemplary embodiment of the writing instrument of FIG. 1.

Referring now to FIG. 6, a third exemplary embodiment of the writing instrument 110 of FIG. 1 is shown. Herein, the writing instrument 110 is a passive RF signaling device that operates as a virtual-ink writing instrument by not dispensing physical-ink during the writing process. Rather, as the user places the writing instrument 110 in physical contact with the writing area of the tablet and glides an end of the writing instrument 110 over the writing area, the tablet signals the computing device to display a graphical representation as made in the writing area.

As generally shown, the writing instrument 110 includes a casing 600 made of a rigid material such as hardened plastic. The casing 600 protects a wireless communication circuit 610 that is placed within an inner cavity 605 formed by the casing 600. The wireless communication circuit 610 includes an antenna 620 and a transponder unit 630 including a signal detector 635 and a color coding circuit 640. The wireless communication circuit 610 may receive power from one or more power sources placed within the casing 600 such as a battery for example. Of course, where the writing instrument 110 is tethered to the tablet 100 of FIG. 5A, power may be supplied via that tablet.

The antenna 620 is tuned to receive signals at a selected frequency from the tablet. Upon determining that a color inquiry signal 550 at the selected frequency has been received, the signal detector 635 of the transponder unit 630 rectifies the received signal to produce a voltage that activates the color coding circuit 640. For this embodiment, the color coding circuit 640 produces the color reply signal 560 in response to the color inquiry signal 550. For one embodiment, the color reply signal 560 is a signal at the selected frequency modulated with a RF identification tag 650 permanently stored within the color coding circuit 640. The RF identification tag 650 is a unique value representative of the virtual-ink color associated with the writing instrument 110.

Although not shown, an alternative embodiment of the wireless communication circuit 610, operating as an active RF device, may includes a power source, a transponder and an internal memory. The power source may be one or more removable batteries, which supply power to the transponder and internal memory. The internal memory may be implemented as non-volatile memory to maintain stored data without the application of power from the power source. The stored data would include the RF identification tag.

Figure 7A:
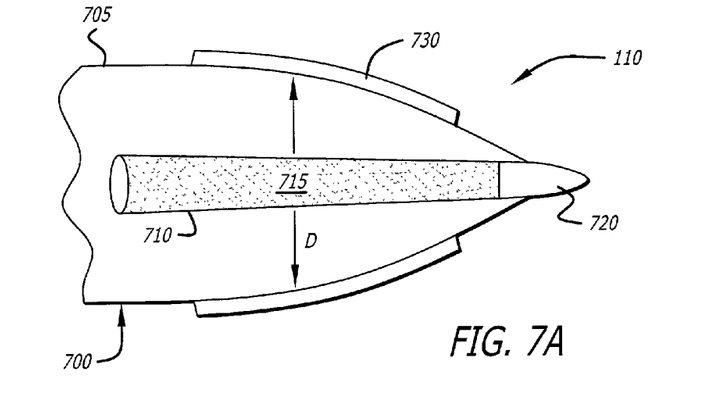
FIGS. 7A and 7B is a collective representation of a fourth exemplary embodiment of the writing instrument of FIG. 1.
Figure 7B:
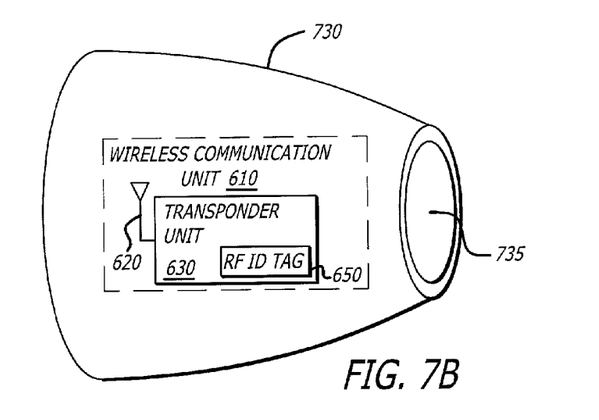

Referring now to FIGS. 7A and 7B, a collective representation of a fourth exemplary embodiment of the writing instrument 110 of FIG. 1 is shown. For this embodiment, the writing instrument 110 operates as a physical-ink writing instrument containing a writing solution.

The writing instrument 110 includes a casing 700 generally encapsulating a reservoir container 710. The reservoir container 710 stores the writing solution 715 and supplies the writing solution 715 to a writing head 720 of the writing instrument 110 during use. The writing head 720 may be a porous felt marker tip, a ball point and the like.

As generally shown, a sleeve 730 is adapted for placement over an outer surface 705 of the casing 700. For instance, in one embodiment, the sleeve 730 includes a cylindrical aperture 735 for placement over a portion of the outer surface 705 of the casing 700. The sleeve 730 is made of a generally pliable material which allows the inner diameter of the cylindrical aperture 735 to be approximately equivalent to or even slightly less than a diameter (D) formed by the outer surface 705 of the casing 700. This allows the sleeve 730 to fit snugly on the casing 700. Of course, the sleeve 730 is made of a rigid material and features an inner diameter formed by the aperture 735 that is substantially equal to the diameter (D) of the casing 700 or a single piece of material that can be applied and fastened to any type of writing instrument.

The sleeve 730 is adapted with wireless communication unit 610 including the antenna 620 and transponder unit 630 as discussed in FIG. 6. The RF identification tag 650 indicates a color that corresponds with the color of the sleeve 730. The transponder unit 630 periodically outputs the RF identification tag 650 in response to color reply signals from the writing tablet.

Figure 8:
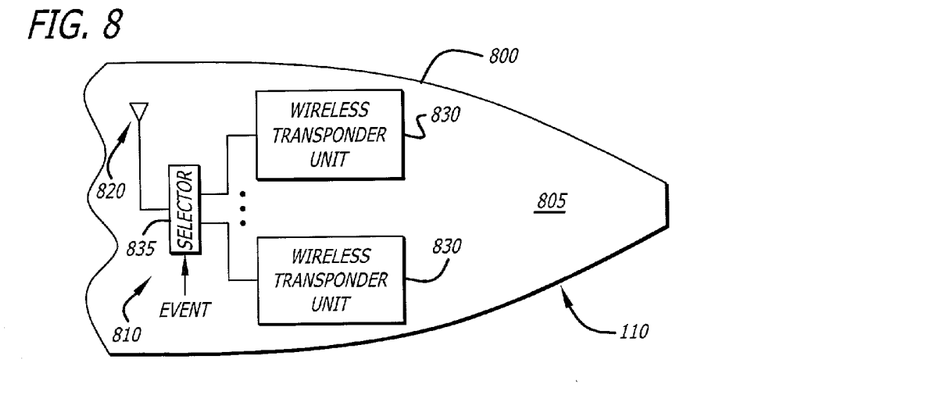
FIG. 8 is a fifth exemplary embodiment of the writing instrument of FIG. 1.

Referring now to FIG. 8, a fifth exemplary embodiment of the writing instrument 110 of FIG. 1 is shown. Similar to FIG. 6, the writing instrument 110 is a virtual-ink writing instrument that does not dispense ink during the writing process. The writing instrument 110 includes a casing 800 made of a rigid material. The casing 800 protects logic 810 placed within an inner cavity 805 formed by the casing 800.

As generally shown, the logic 810 includes an antenna 820 and a plurality of wireless transponder units 830. Each of the wireless transponder units 830 is adapted to transmit a unique RF identification tag associated with a particular color. The selection of the wireless transponder units 830 is currently associated with the writing instrument 110 is performed by a selector circuit 835 (e.g., switches, etc.) in response to an event. Examples of an event include a user-initiated action such as depression of a depressible button protruding from the casing 800 or rotation a portion of the casing 800 to a rotational position that represents the particular color identifier and the like. After selection of a wireless transponder unit 830, the particular color coding circuit and corresponding RF identification tag may be used in responding to a color inquiry signal at a frequency recognized by the selected wireless transponder unit.

Figure 9:
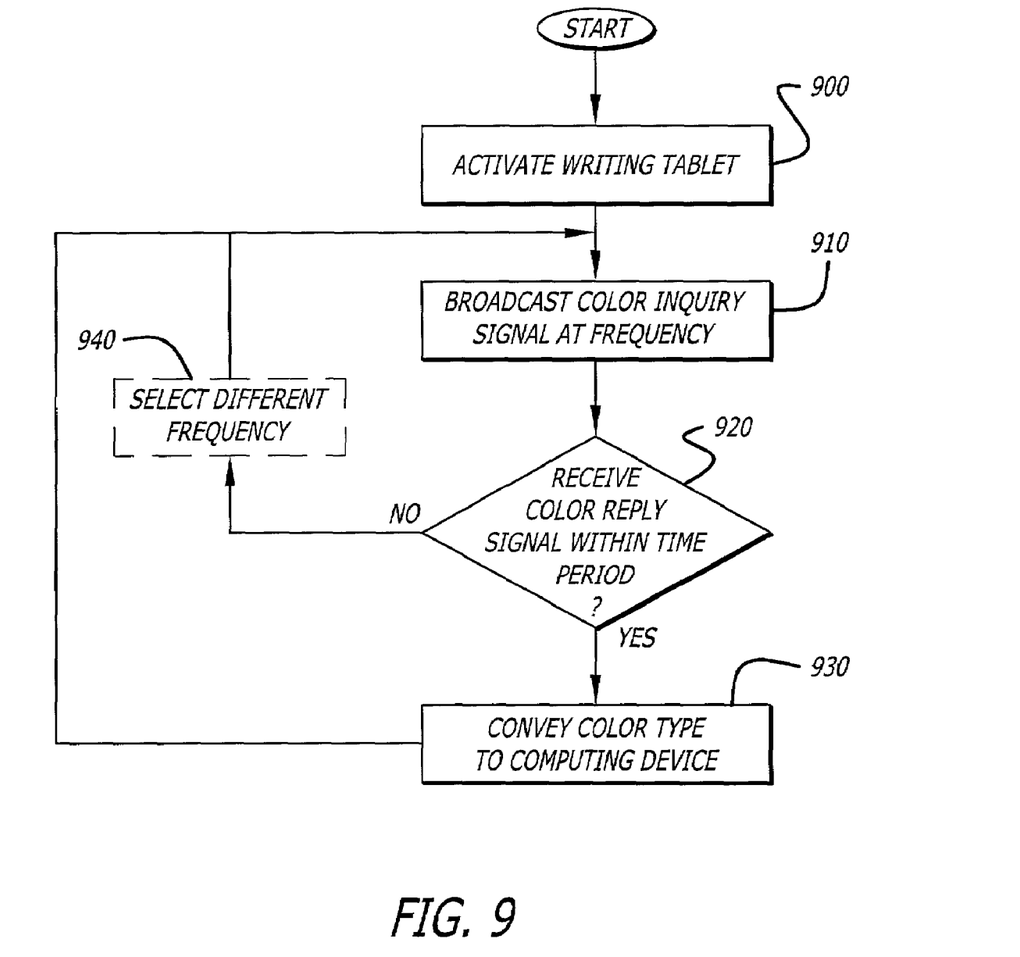
FIG. 9 is an exemplary block diagram of a flowchart featuring the operations of the writing tablet in communication with the writing instrument of FIG. 1.

Referring now to FIG. 9, an exemplary embodiment of the exchanged communications between the writing tablet and the writing instrument of FIG. 1 is shown. These operations may be performed, in part, by logic within the tablet such as software modules executed by a processor for example.

Upon activation, the tablet periodically transmits a RF signal, referred to as a color inquiry signal, at a selected frequency (blocks 900 and 910). Such transmission may occur in a broadcast or multicast capacity for example. The transmission range for a writing instrument to detect the color inquiry signal may be adjusted at manufacturer or adjusted by the user via the computing device. The transmission may be over a portion of the writing surface to assist in identifying the location of the writing instrument.

After transmission of the color inquiry signal, the tablet monitors whether it receives a color reply signal within a prescribed time period (block 920). If so, logic within the tablet extracts the RF identification tag from the color reply signal and conveys the information to the computing device regarding the ink color associated with the writing instrument (block 930). If the color reply signal is not received within a prescribed time period, a color inquiry signal at a different frequency is transmitted in efforts to detect a different color writing instrument in use (block 940). This operation is optional (as represented by dashed lines) for those tablets that support multiple colors. The above-described method continues as an iterative process to continuously search for writing instruments being used on the tablet. The periodicity of the transmissions and detection may be fast enough to support multiple writing instruments being used concurrently on the tablet.

While certain exemplary embodiments have been described and shown in the accompanying drawings, it is to be understood that such embodiments are merely illustrative of and not restrictive on the broad invention, and that this invention not be limited to the specific constructions and arrangements shown and described. For example, it may be possible to implement the invention or some of its features in hardware, firmware, software or a combination thereof.

What is claimed is:

1. A writing instrument comprising:
   a casing containing a reservoir to store a writing solution and a writing head that is adapted to dispenses some of the writing solution; and
   a sleeve adapted for placement over a cylindrical portion of an outer surface of the casing, the sleeve includes a transponder that periodically outputs a radio frequency (RF) identification tag to identify at least a virtual ink color of associated with a line segment produced by the writing instrument when used with a writing tablet.

2. The writing instrument of claim 1, wherein the RF identification tag further identifies other indicia associated with line segment, the other indicia comprises at least one of line segment thickness, animation effects and special effects.

3. The writing instrument of claim 2, wherein the wireless transponder is an inductor-capacitor (LC) circuit.

4. The writing instrument of claim 3, wherein the RF identification tag further identifies a line segment pattern type.

5. The writing instrument of claim 1, wherein the sleeve configured for attachment to the casing, the sleeve when attached includes a cylindrical aperture having an inner diameter substantially equivalent to a diameter formed by the outer surface of the casing.

6. The writing instrument of claim 5, wherein the sleeve is made of a generally pliable material.

7. The writing instrument of claim 1, wherein the RF identification tag identifies additional line style parameters besides the virtual ink color associated with the writing instrument.

8. The writing instrument of claim 7, wherein the wireless transponder outputs the RF identification tag by resonating a unique frequency corresponding to the virtual ink color.

9. The writing instrument of claim 7, wherein the virtual ink of the writing instrument is a color being displayed on a display screen of the writing tablet.

10. The writing instrument of claim 7, wherein the transponder includes (i) a signal detector to rectify a color inquiry signal from the writing tablet to produce a voltage and (ii) a color coding circuit to produce a signal at a selected frequency modulated with the RF identification tag.

11. The writing instrument of claim 7, wherein the RF identification tag identifies a line style parameter related to thickness of the line segment produced by the writing instrument.

12. The writing instrument of claim 1, wherein the RF identification tag identifies a line style parameter related to a pattern of the line segment produced by the writing instrument.

13. The writing instrument of claim 1, wherein the RF identification tag identifies a line style parameter related to a level of transparency associated with the line segment produced by the writing instrument.

14. The writing instrument of claim 1, wherein the RF identification tag identifies a line style parameter related to a blending of at least one identical types of indicia and different types of indicia.

15. The writing instrument of claim 14, wherein one of the identical types of indicia include at least two virtual ink colors.

16. A method comprising:
- receiving a color inquiry signal by a sleeve adapted for placement over a cylindrical portion of an outer surface of a casing of a writing instrument, the color inquiry signal requesting information regarding a virtual ink color of the writing instrument;
- outputting a radio frequency (RE) identification tag by the sleeve to indicate the virtual ink color of the writing instrument, the RF identification tag is a unique frequency, resonated by a transponder of the writing instrument, that corresponds to the virtual ink color; and
- displaying a portion of a graphical representation formed by the writing instrument in the color specified by the RF identification tag.

17. The method of claim 16, wherein the RF identification tag is automatically output by the sleeve of the writing instrument.

18. The method of claim 16, wherein automatic output of the RF identification tag is periodic.

19. A method comprising:
- outputting a radio frequency (RF) identification tag by a sleeve adapted for placement over a cylindrical portion of an outer surface a writing instrument to indicate a line style parameter of the writing instrument, the sleeve includes a transponder that periodically outputs the RF identification tag; and
- displaying a portion of a graphical representation formed by the writing instrument according to the line style parameter specified by the RF identification tag.

20. The method of claim 19, wherein the line style parameter includes ink color of the writing instrument.

21. The method of claim 20, wherein the outputting of the RF identification tag includes
- receiving a color inquiry signal from a writing tablet used to convey graphical representations formed by the writing instrument to a computing device for display; and
- outputting a color reply signal from the writing instrument to acknowledge receipt of the color inquiry signal and provide the RF identification tag associated with the writing instrument.

* * * * *